United States Patent [19]

Jenekhe et al.

[11] Patent Number: 5,002,699

[45] Date of Patent: Mar. 26, 1991

[54] ELECTRICALLY CONDUCTING POLYMERS AND COMPLEXES

[75] Inventors: Samson A. Jenekhe, Rochester, N.Y.; Stanley F. Lo, Minneapolis, Minn.

[73] Assignee: Honeywell Inc., Minneapolis, Minn.

[21] Appl. No.: 291,811

[22] Filed: Dec. 29, 1988

[51] Int. Cl.$^5$ ............................................. H01B 1/06
[52] U.S. Cl. .................... 252/500; 252/518; 528/232; 528/242; 528/248
[58] Field of Search .............. 252/500, 518; 528/248, 528/242, 232, 240

[56] References Cited

U.S. PATENT DOCUMENTS 4,452,725  6/1984  Wellinghoff et al. .
4,548,738  10/1985  Jenekhe et al. .
4,598,139  7/1986  Jenekhe et al. .
4,624,999  11/1986  Jenekhe et al. .

Primary Examiner—Josephine Barr
Attorney, Agent, or Firm—Michael B. Atlass; C. G. Mersereau

[57] ABSTRACT

Electrically conducting polymer complexes, prepared from N-substituted carbazoles, p-acetoxylbenzaldehyde, and protic acids, are soluble in polar organic solvents giving conductive polymer solutions processable to stable conductive films, coatings, and sponges.

20 Claims, 3 Drawing Sheets

ELECTRICALLY CONDUCTING POLYMERS AND COMPLEXES

The United States Government has certain rights with respect to the invention pursuant to a contract awarded by the Department of the Navy.

BACKGROUND OF THE INVENTION

1. Field of the Invention

The present invention relates to environmentally stable organic polymers and, more particularly, to processible polymers synthesized from N-alkylsubstitued carbazole and p-acetoxybenzaldehyde which are highly conducting as synthesized. The term polymer as used herein also includes oligomers where indicated.

2. Related Art

Organic materials that behave as metals or semiconductors provide the advantages of these materials together with additional advantages of being soluble in organic solvents or having low melting points and glass transition temperatures. This minimizes the cost of processing and permits composites to be made with thermally sensitive materials such as doped Si or GaAs, for example. The enormous molecular design flexibility of organic chemistry enables precise tailoring of properties to fill a wide range of applications as enumerated above. In addition, the high strength and conductivity-to-weight ratios lend the advantage of fabrication of many electrical devices of much lower weight than conventional materials.

Theoretically, conductivity takes place both along the polymer chain and between adjacent chains. The active charge carrier, at least in the aromatic materials, is believed to be a bipolaron that is delocalized over several polymer repeating units. The mobility of such a species along the polymer chain is reduced by conformational disorder, necessitating a rigid highly crystalline chain structure for maximum intrachain conductivity. Various mechanisms such as "hopping" and "interchain exchange" are thought to be responsible for the interchain part of the conductivity. Unfortunately, all of the most highly crystalline polymers of high conductivity are insoluble and infusible. Therefore other materials have been sought.

Successful environmentally stable doped conducting polymers are described in U.S. Pat. No. 4,452,725 to S. T. Wellinghoff, S. A. Jenekhe (an inventor in the present application) and T. J. Kedrowski and has a common assignee with the present application. That patent concerns conducting polymers of N-alkyl 3,6' carbazolyl chemically doped with charge transfer acceptor dopants such as halogens. Environmentally stable polymer complexes of processible poly (3,6-N-alkylcarbazolyl alkenes) which also become highly conductive upon doping with charge transfer acceptors such as iodine are described in U.S. Pat. Nos. 4,548,738 and 4,598,139 also to the same S. A. Jenekhe and one B. J. Fure and commonly assigned with the present application. Organic polymers synthesized from carbazole or N-substituted carbazoles and benzaldehyde or certain substituted benzaldehydes also made conductive by virtue of doping with charge transfer acceptors are disclosed in yet another commonly assigned S. A. Jenekhe invention in U.S. Pat. No. 4,624,999.

SUMMARY OF THE INVENTION

The present invention provides new thermoplastic organic heterocyclic linear condensation polymeric materials and complexes which are solution and/or melt processible to films, fibers and other shapes, which intrinsically, as prepared, exhibit controllable high p-type conductivity in the range characteristic of semiconductors. The polymers are products of condensation polymerization of an N-alkyl substituted carbazole with p-acetoxybenzaldehyde. The genus has the following basic polymer protic acid complex structure:

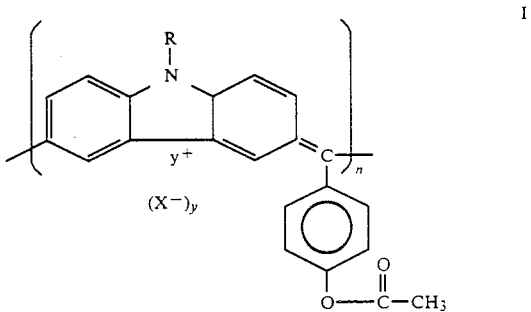

Where
X is a protic acid ion
$0 < y < 2$
R is an alkyl group having from 1 to 5 carbon atoms; and
n is an integer having a value from 2 to about 500.

The protic acid complexes of poly (3,6-N alkylcarbazolyl p-acetoxybenzylidene) normally are prepared by simultaneous polymerization and doping in a solution containing the protic acid. This forms electrically conductive heterocyclic polymer complexes which are also soluble in polar solvents. The preferred complex is poly (3,6-N-methylcarbazolyl p-acetoxybenzylidene) bisulfate. This complex is normally prepared by, the condensation of N-methylcarbazole with p-acetoxybenzaldehyde catalyzed by sulfuric acid. The sulfuric acid also complexes with the resulting polymer in solution and produces the bisulfate complex. The structural formula of the bisulfate complex may be represented by:

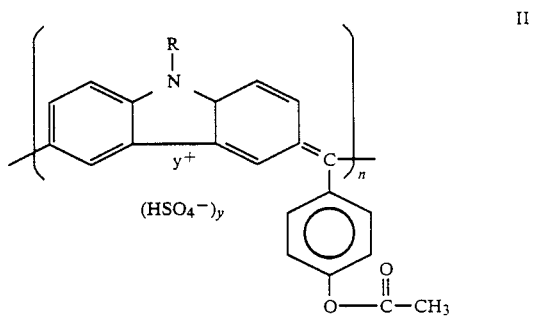

Where
$0 < y < 2$
R is an alkyl group having from 1 to 5 carbon atoms; and
n is an integer having a value from 2 to about 500.

The conductive polymers of the present invention require no further dopant or doping step in their preparation other than that introduced by the protic acid catalyst during polymerization.

Introduction of the polar acetoxy group as a side group affects remarkable changes in properties compared to even poly (3,6-N-methylcarbazolyl benzylidene) (PMCZB), structure with phenyl as the substitute group, for example, solubility in polar solvents to give electrically conducting polymer solutions is greatly enhanced.

DETAILED DESCRIPTION OF ILLUSTRATIVE EMBODIMENTS

Figure 1:
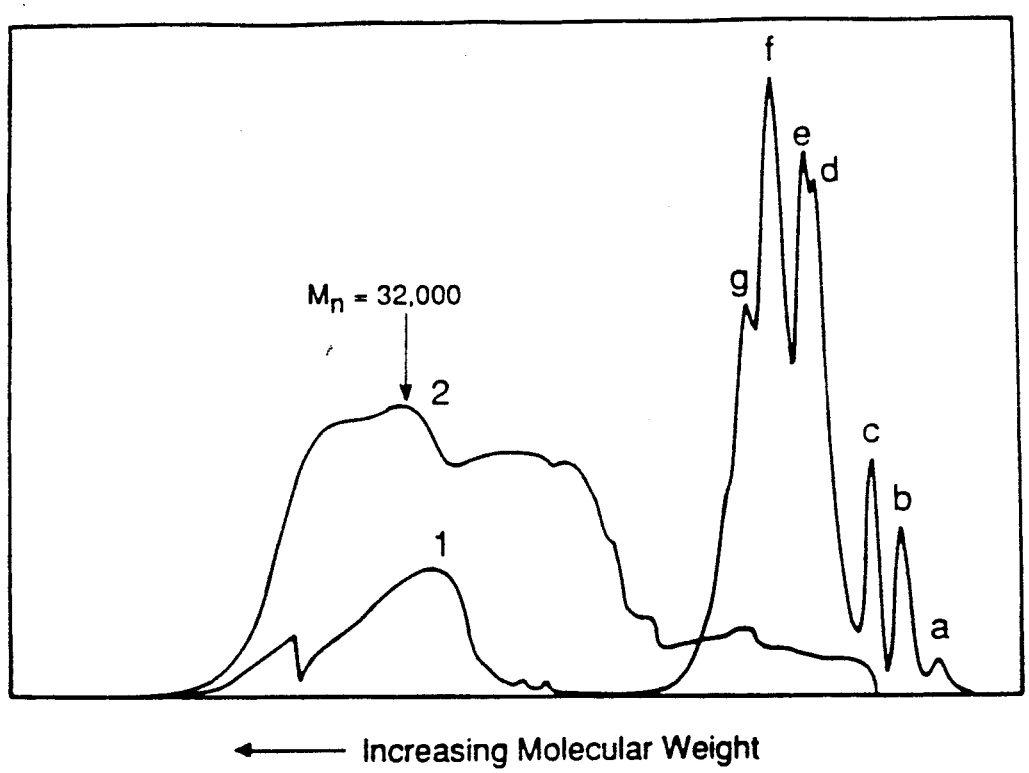
FIG. 1 shows the GPC traces of the molecular weight distributing in two polymerizations of the polymer complex of structure II.

For use in the polymerization an N-alkyl carbazole in the form of n-methylcarbazole was prepared according to procedure next described N-methyl-carbazole prepared in this manner was used in the polymerization of Examples 1 through 3.

120 g of carbazole was dissolved in 600 ml acetone/180 ml dimethyl sulfate $(CH_3)_2SO_4$ in a reaction flask. Next, 120 g NaOH pellets was added to the reaction solution. Distilled water was dripped slowly into the reaction flask with stirring. The flask was allowed to reflux for three (3) hours, and then cooled for 20 minutes. The reaction mixture was quenched in cold distilled water and off-white crystals precipitated. The precipitate was recrystallized in distilled water to yield white crystals. The melting point of 91.1° C., compared favorably with the literature value of 87–88° C. for N-methylcarbazole.

In accordance with the invention, examples 1 and 2 are directed to an intrinsically conducting polymeric material, poly (N-alkylcarbazolyl p-acetoxybenzylidene) in the form using the methyl substituted carbazole (PMCZAB), which is highly conducting as synthesized, and thus requires no external dopant. Structure II shows the polymer structure and composition for the generic bisulfate embodiment.

EXAMPLE 1: (PMCZAB-1)

10.949 g (0.0667 mole) para-acetoxybenzaldehyde (Fairfield Chemical Co.) and 1.23 ml $H_2SO_4$ were added to 150 ml dioxane solvent in a reaction vessel with flowing argon. 12.083 g (0.0667 mole) N-methylcarbazole in 100 ml dioxane was next added. Additional 4 ml of $H_2SO_4$ was added within 1 hour. The mechanical stirrer was rotated at 100 rpm. The reaction vessel was thermostated in an oil bath held at 92° C. After 51 hr. reaction time, the reaction mixture was quenched into 1,500 ml methanol. The resulting suspension was evaporated on a hot plate till about 100 ml with methanol (acetone:methanol=3:1), evaporated until dry. A metallic copper-brown solid represented by structure II was obtained.

EXAMPLE 2: (PMCZAB-2)

The same procedure as in Example 1 was used except that 5.23 ml conc. $H_2SO_4$ was added at once, the reaction temperature was 93° C., and the polymerization time was 51 hr. 46 min.

As synthesized poly (N-methylcarbazolyl p-acetoxybenzylidene) PMCZAB-1 and PMCZAB-2 were highly conducting (about $10^{-1}$ ohm$^{-1}$ cm$^{-1}$) metallic copper-colored polymers. The polymers are stable in air and processible by solvent casting from solutions in dimethylformamide (DMF) and other solvents. The preferred alkyl substitute is methyl.

Main advantages includce the excellent environmental stability of the polymeric conductor and the one-step process of making it, requiring no further external doping. As a consequence, ready fabrication of articles from the material is possible. Also, the material, unlike many prior carbazole derivatives, does not require doping with such agents as $Br_2$ and $I_2$, which might corrode metals in electronic applications.

The direct synthesis of complexed poly (3,6-N-methylcarbazolyl p-acetoxybenzlidene) (PMCZAB) and its properties are next addressed.

EXAMPLE 3

The following is a typical polymerization procedure for poly (3,6-N-methylcarbazolyl p-acetoxybenzylidene). 10.949 g (66.7 nmol) para-acetoxybenzaldehyde and 5.23 ml (94.2 mmol) $H_2SO_4$ were added to 150 ml dioxane solvent in a reaction flask and followed with 12.083 g (66.7 mmol) N-methylcarbazole in 100 ml dioxane. The reaction vessel was thermostated in an oil bath held at 92° C. The reaction mixture was stirred with a mechanical stirrer at 100 rpm under argon atmosphere After 75 hr. reaction time, the mixture was quenched into 100 ml of methanol. The resulting solution suspension was evaporated on a hot plate until about 200 ml remained at which time about 600 ml acetone was added. The resulting solution was stirred and evaporated until dry. A metallic copper-brown colored solid was collected. Elemental analysis calculated for the repeating unit $[(C_{22}H_{16}NO_2)^{y+} (HSO_4^{31})y]_n$ for $y=1.3$: %C=58.39, %H=3.85, %N=3.09, %O=25.45, %S=9.20; found:%C=58.24, %H=5.12, %N=2.98, %O=24.48, %S=9.12. The compound may be represented by the structure II with $y=1.3$.

In subsequent polymerizations, the amount of initial sulfuric acid was varied and the value of y determined by elemental analysis was found to be 1.2–1.7. Attempts to reduce the oxidized polymer in structure II, by reactions with $NaHCO_3$ or sodium dithionite were not successful.

The as-synthesized polymer bisulfate complexes exhibit a high d.c. conductivity ($\sim 10^{-2}$ to 0.1 ohm$^{-1}$ cm$^{-1}$) without further doping and are found to contain up to 1.2–1.7 moles of the bisulfate counterion per polymer repeating unit. The copper colored polymer complex is largely amorphous but exhibits a melting point of about 234° C. probably due to the bisulfate counterion. The observed optical absorption maxima at $\sim 604$–636 nm are attributed to charge transfer bands. The polymer complex can be processed into dense continuous films of sponge-like morphology from conductive solutions.

With respect to the complex of Example 3, polymer molecular weight distribution was characterized using a Waters Model 150C gel permeation chromatograph (GPC) at 100° C. in dimethylformamide (DMF). The GPC was packed with 10⁵, 10⁴, 10³, and 500 Angstrom ultrastyrogel columns in DMF and operated at a flow rate of 1 mL/min. UV-Visible-near IR spectra were obtained using thin films cast on sapphire wafers and a Perkin-Elmer Model Lambda 9 UV-Vis-NIR spectrophotometer in the wavelength range 185–3,200 nm.

Fourier transform infrared (FTIR) spectra of thin films of the bisulfate complex of PMCZAB cast on KCl plates were obtained using a Digilab Model FTS-14 spectrometer. Films were cast from DMF solutions.

Thermal analysis, including differential scanning calorimetry (DSC) and thermogravimetric analysis (TGA), was done using a DuPont Model 1090B thermal analyzer equipped with a DSC cell module and a Model 991 TGA module. Samples were sealed in DSC cells and run from 25–600° C. at 10° C./min; TGA runs were likewise performed at 10° C./min in air or nitrogen atmospheres.

X-ray diffraction patterns of the polymer samples were obtained using a Rigaku powder x-ray diffractometer with a sealed tube CuK$\alpha$ x-ray radiation at 1.540562 Angstrom wavelength. The 2$\theta$ scans were from 3–90°, step size of 0.02° and 1-second counting time per step.

The morphology of the fracture surfaces of PMCZAB complexes was observed with a Cambridge SR-4 scanning electron microscope (SEM). The d.c. conductivity measurements were made on films cast on glass slides using principally a two-point technique but also a standard four-point probe instrument.

The 3,6-carbazolyl structure II was assigned based on knowledge of similar carbazobe/aldehyde condensation polymers. Calculated and observed elemental analyses were in reasonable agreement. EDAX of the sample observed in the SEM showed a strong sulfur peak and no other elements. The EDAX mapping of sulfur in the samples revealed a uniform distribution. Also, the ESCA spectra of the surface and sputtered surface (−50 A) gave the expected qualitative composition. The mole ratio of the dopant counterion ($HSO_4^-$) to the polymer repeating unit, y, was found to be always greater than 1 (1.2–1.7) in four polymerizations. Although the hydrogen analysis was higher than calculated, loss of the methine hydrogen was inferred from the high conductivity of the polymer complex and previous work on related polymers.

The simultaneous polymerization and doping in solution using a Bronsted acid catalyst ($H_2SO_4$) is noteworthy. This result shows that similar polymerization and doping in solution may be reasonably predicted using other protic acids HX, such as $HClO_4$, $HBF_4$, $CH_3SO_3H$, etc. The polymer complex PMCZAB$^{y+}$($HSO_4^-$)$_y$ is soluble in several organic polar solvents, including methanol, ethanol, DMF, N-methyl-2-pyrrolidone (NMP) and partially in water, acetone, and acetonitrile. The purple colored solutions which are conductive have been used to produce conductive films by solvent casting on substrates. This adds to the few known conducting polymer solutions: polycarbazoles in liquid iodine and poly(p-phenylene sulfide) in liquid $AsF_5/AsF_3$. By use of other protic acids (HX) in the polymerization, a system of conducting polymer solutions of PMCZAB$^{y+}$(X$^-$)$_y$ with different anions could be prepared for various uses.

FIG. 1 shows the GPC traces of the molecular weight distribution in two polymerizations. Curves 1 and 2 correspond to a short (~48 hr.) and long (75 hr.) polymerization time, respectively. In addition, the relative amount of initial acid catalyst is three times less in the polymerization of curve 1 compared to curve 2. It is interesting that both a small high molecular weight fraction and a large low molecular weight fraction are present in the product of curve 1. However, the polymer sample from the longer polymerization time and larger amount of acid catalyst gave a predominantly high molecular weight polymer with a broad molecular weight distribution. The discrete peaks marked as a, b, c, etc. in curve 1 of FIG. 3 were identified as corresponding to oligomers n=1, 2, 3, etc. of the polymer II without the counterion. An excellent linear fit of the molecular weight $M_n=328.4$ n+181.24 plotted against the elution volume was obtained for n>2 and used to estimate $M_n$ and $DP_n$ for the high molecular weight fractions. The high molecular weight fraction in curve 2 gave $M_n \sim 8,500$–80,000 or $DP_n \sim 26$–244.

Figure 2:
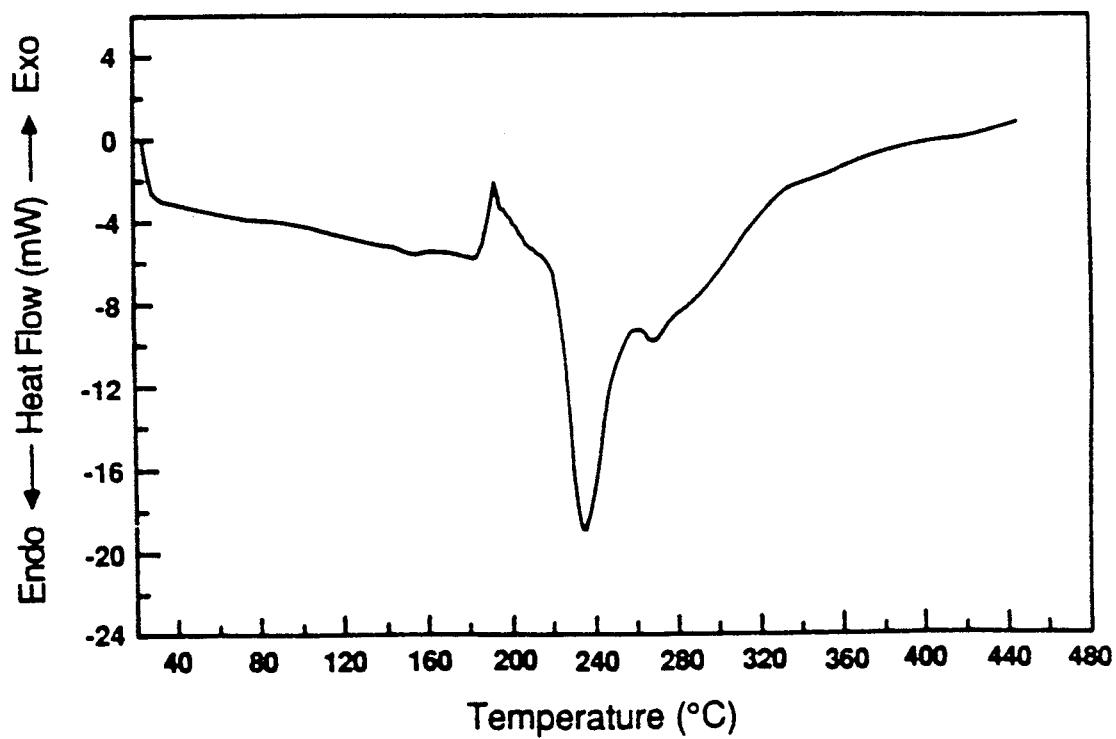
FIG. 2 shows the DSC thermogram of the polymer complex of structure II.

FIG. 2 shows the DSC thermogram of the polymer complex. indicating a large endothermic peak at 234° C. which is interpreted as melting. The polymer complex decomposes above 260–280° C., as indicated by the continuously increasing DSC curve. The weight loss characteristic of the complex revealed by TGA which shows onset of initial decomposition at ~200° C. resulting in ca 20% weight loss at 425° C. is attributed to volatilization of the bisulfate anion; this is to be compared to ~26–33% $HSO_4^-$ found in samples of the polymer complex by elemental analysis for y=1.2–1.7. Other members of the neutral polymers of structure I had onset of thermal decomposition at ~420–450° C.

Figure 3:
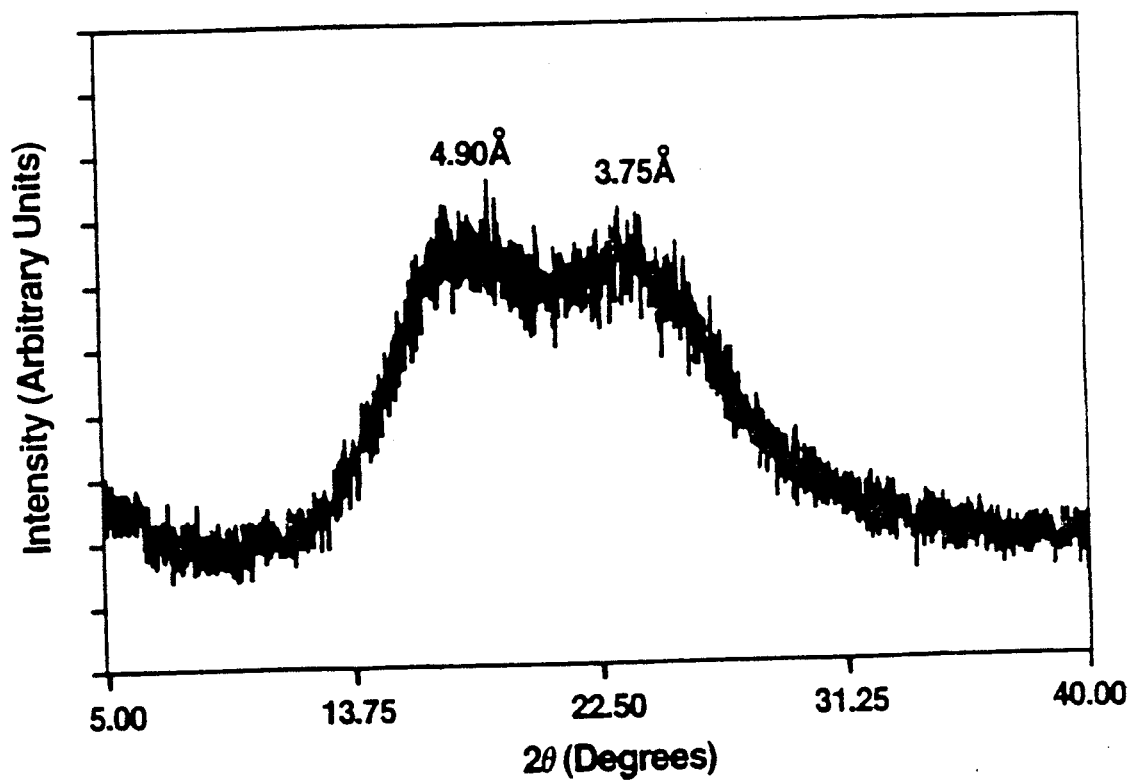
FIG. 3 depicts x-ray diffraction patterns of the polymer complex of structure II.

X-ray powder diffraction patterns of the polymer complex are shown in FIG. 3. Two broad peaks with Bragg d-spacing at ~4.90 and ~3.75 Angstrom are evident. The x-ray diffraction (XRD) patterns indicate that the degree of crystallinity is not very high or that the crystallite sizes are very small compared to the spatial resolution of XRD.

The typical morphology of the fracture surface of a bulk sample of conductive PMCZAB/$HSO_4^-$ complex was a dense continuous morphology characteristic of bulk or thin film samples prepared from solutions under slow solvent evaporation rate. Rapid evaporation of solvent from a highly viscous solution of the polymer complex resulted in a porous or sponge-like morphology in bulk samples or films.

The measured room temperature d.c. conductivity of (PMCZAB$^{y+}$)($HSO_4^-$)$_y$ films for four different y values in the range 1.2–1.7 was ~0.01 to 0.10 ohm$^{-1}$ cm$^{-1}$. This conductivity of samples stored in air has remained stable for over two years. Quantitative study of the conductivity of the electrically conducting solutions of the polymer complex has not been made. Also, the photoelectronic properties of PMCZAB complex have not yet been studied.

Figure 4:
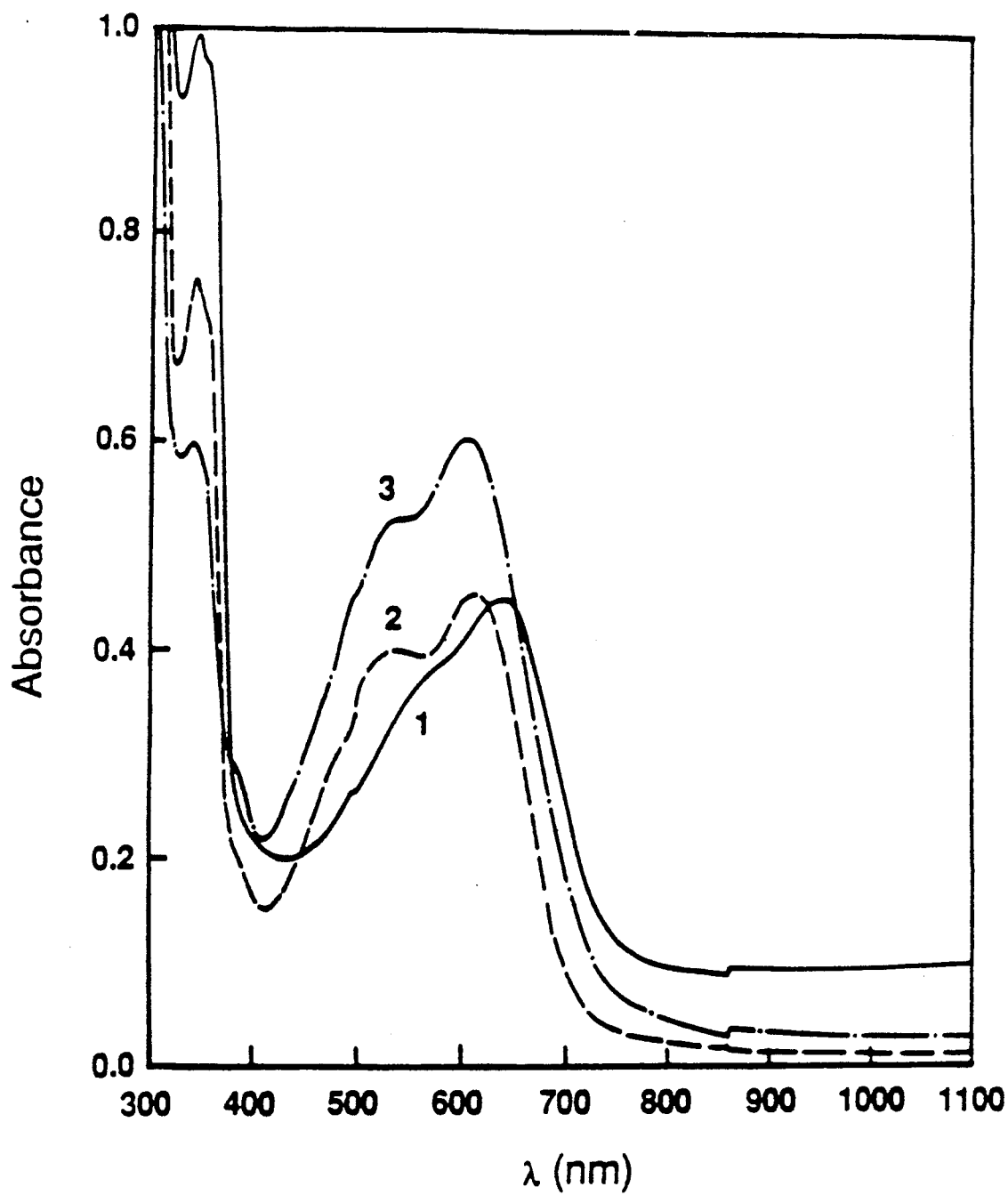
FIG. 4 shows the electronic absorption spectra of thin films of the complex of structure II.

FIG. 4 shows the electronic absorption spectra of PMCZAB$^{y+}$($HSO_4^-$)$_y$ thin films for three different polymerizations (y=1.2–1.7). The optical absorption maximum ($\lambda_{max}$) is located at 604–636 nm with a shoulder band maximum at 537–564 nm. This electronic absorption maximum is attributed to the charge transfer (CT) band commonly observed in carbazole-containing polymer charge transfer complexes. The two CT bands are also observed in complexes of carbazole monomers: carbazole (CZ)/Chloranil (540 nm; 504 nm); N-ethyl-carbazole/Chloranil (600±5 nm; 506±2 nm). The characteristic assymmetry of the CT bands of carbazoles has been attributed to the two superposed bands which originate from transitions from the two highest occupied molecular orbitals (HOMO 1, HOMO 2) of carbazole moiety to the lowest unoccupied molecular orbital (LUMO) of the acceptor: HOMO 1 - LUMO and HOMO 2 - LUMO. The two HOMOs that are separated by ~0.4–0.5 eV thus give rise to the two observed CT bands separated by a similar energy. The CT bands of FIG. 4 can be similarly explained. However, the two CT bands of FIG. 4 are separated by only —0.25–0.28 eV. Also, the low energy band is the more intense of the two CT bands in FIG. 4 in contrast to PVK complexes. The smaller energy difference between the two CT bands of PMCZAB/HSO$_4^-$ complex compared to ~0.4–0.5 eV typically found in PVK complexes thus suggests that the difference between the first and second ionizati,on potentials of PMCZAB is smaller than in PVK.

The related electronic absorption in the UV which are shown in part in FIG. 4 revealed bands characteristic of the carbazole moiety with $\lambda_{max}$ at 336–340 nm and 298–302 nm.

What is claimed is:

1. A polymer complex comprising a species selected from the group consisting of N-alkyl carbazoles and p-acetoxybenzaldehyde complexed with a protic acid which may be represented by the structural formula:

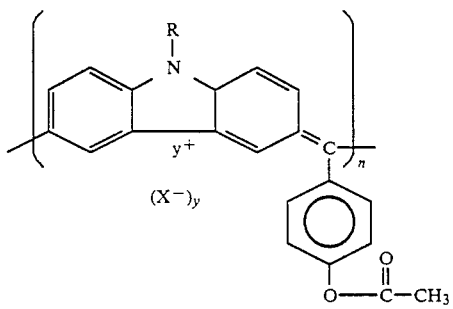

where
X = a protic acid counterion,
R = an alkyl group having 1–5 carbon atoms,
n = a integer from 2 to about 500 and 0 < y < 2

2. The polymer complexes of claim 1 wherein R is methyl.

3. The polymer complexes of claim 1 wherein said protic acid counterion is selected from $ClO_4^-$, $BF_4^-$, $CH_3SO_3^-$ and $HSO_4^-$, 4. The complex of claim 3 wherein the alkyl group is methyl.

5. The polymer complex of claim 3 wherein the counterion is a bisulfate ion and wherein the complex may be represented by the structural formula:

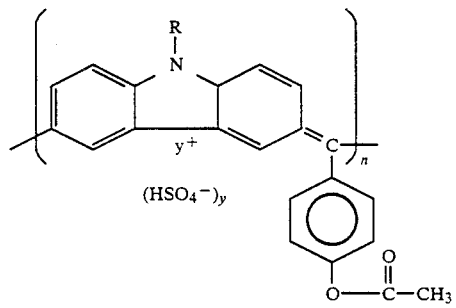

6. The complex of claim 5 wherein the alkyl group is methyl.

7. A conductive polymer solution of a polymer complex comprising a species selected from the group consisting of N-alkyl carbazoles and P-acetoxybenzaldehyde complexed with a protic acid which may be represented by the structural formula:

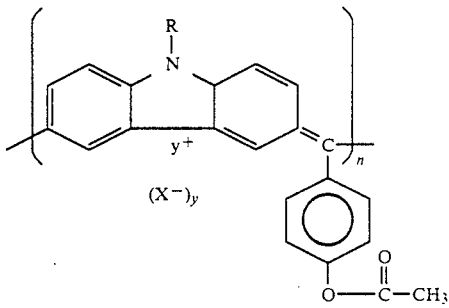

and an amount of polar organic solvent.

8. The solution of claim 7 wherein said protic acid is $H_2SO_4$ and wherein the complex may be represented by the structural formula:

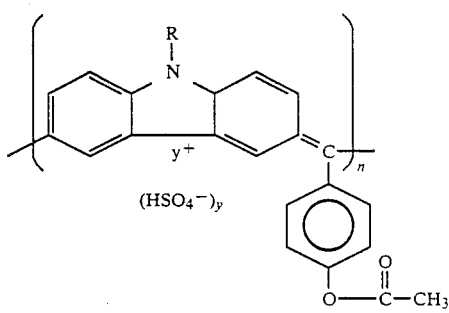

where
R = an alkyl group having 1–5 carbon atoms,
n = a integer from 2 to about 500 and 0 < y < 2

9. The solution of claim 8 wherein said alkyl group is methyl.

10. The conductive polymer solution of claim 6 wherein the polar organic solvent is selected from dimethylformamide (DMF), methanol,
N-methyl-2-pyrrolidone (NMP), acetonitrile, acetone, or mixtures thereof.

11. The conductive polymer solutions of claim 1 wherein the polar organic solvent is selected from dimethylformamide (DMF), methanol, N-methyl-2-pyrrolidone (NMP), acetonitrile, acetone, or mixtures thereof.

12. The conductive polymer solutions of claim 8 wherein the polar organic solvent is selected from dimethylformamide (DMF), methanol,
N-methyl-2-pyrrolidone (NMP), acetonitrile, acetone, or mixtures thereof.

13. The conductive polymer solutions of claim 9 wherein the polar organic solvent is selected from dimethylformamide (DMF), methanol,
N-methyl-2-pyrrolidone (NMP), acetonitrile, acetone, or mixtures thereof.

14. The complex of claim 5 wherein y is the range from 1.2 to 1.7 moles of the bisulfate counterion per polymer repeating unit.

15. The complex of claim 6 wherein y is the range from 1.2 to 1.7 moles of the bisulfate counterion per polymer repeating unit.

16. The solution of claim 7 wherein said alkyl group is methyl.

17. The complex of claim 8 wherein y is the range from 1.2 to 1.7 moles of the bisulfate counterion per polymer repeating unit.

18. The complex of claim 9 wherein y is the range from 1.2 to 1.7 moles of the bisulfate counterion per polymer repeating unit.

19. The conductive polymer solution of claim 7 wherein the polar organic solvent is selected from dimethylformamide (DMF), methanol, N-methyl-2-pyrrolidone (NMP), acetonitrile, acetone, or mixtures thereof.

20. The conductive polymer solution of claim 16 wherein the polar organic solvent is selected from dimethylformamide (DMF), methanol, N-methyl-2-pyrrolidone (NMP), acetonitrile, acetone, or mixtures thereof.

* * * * *

UNITED STATES PATENT AND TRADEMARK OFFICE
CERTIFICATE OF CORRECTION

PATENT NO. : 5,002,699
DATED : March 26, 1991
INVENTOR(S) : Samson A. Jenekhe; Stanley F. Lo It is certified that error appears in the above-identified patent and that said Letters Patent is hereby corrected as shown below:

Claim 7, Column 8, Line 21, after the formula and before "and" insert --where X = a protic acid counterion, R = an alkyl group having 1-5 carbon atoms, n = a integer from 2 to about 500 and $0 < y < 2$--.

Signed and Sealed this

Twenty-ninth Day of September, 1992

Attest:

DOUGLAS B. COMER

Attesting Officer

Acting Commissioner of Patents and Trademarks